(12) United States Patent
Hoffman et al.

(10) Patent No.: US 12,513,793 B2
(45) Date of Patent: Dec. 30, 2025

(54) METHODS AND SYSTEMS FOR GENERATING A SINGLE PHOTON SOURCE AND A SUPERRADIANT LIGHT SOURCE FROM ACOUSTIC ENERGY

(71) Applicants: Jason Hoffman, Palm Beach Gardens, FL (US); Dylan Hoffman, Gainesville, FL (US)

(72) Inventors: Jason Hoffman, Palm Beach Gardens, FL (US); Dylan Hoffman, Gainesville, FL (US)

(73) Assignee: Jason Hoffman, Palm Beach Gardens, FL (US)

( * ) Notice: Subject to any disclaimer, the term of this patent is extended or adjusted under 35 U.S.C. 154(b) by 221 days.

(21) Appl. No.: 18/511,393

(22) Filed: Nov. 16, 2023

(65) Prior Publication Data
US 2025/0168943 A1 May 22, 2025

Related U.S. Application Data

(60) Provisional application No. 63/426,499, filed on Nov. 18, 2022.

(51) Int. Cl.
*H05B 41/36* (2006.01)
*H05B 47/16* (2020.01)

(52) U.S. Cl.
CPC ............. *H05B 41/36* (2013.01); *H05B 47/16* (2020.01)

(58) Field of Classification Search
CPC .. H04N 13/39; F21V 7/00; F21K 2/00; C03B 5/193; C03B 19/02; B29C 67/20; B01F 23/231; H05B 41/36; H05B 47/16
See application file for complete search history.

(56) References Cited

U.S. PATENT DOCUMENTS

2013/0063438 A1* 3/2013 Billett .................... H04N 13/39
345/424

FOREIGN PATENT DOCUMENTS

KR 20150050162 A * 5/2015 ................ F21V 7/00

OTHER PUBLICATIONS

Translation of KR 20150050162 A (Year: 2013).*

* cited by examiner

*Primary Examiner* — Renan Luque
(74) *Attorney, Agent, or Firm* — POLSINELLI LLP

(57) ABSTRACT

Methods and systems are described herein for converting acoustic energy into a quantum photonics source by creating single bubble sonoluminescence (SBSL). A sonoluminescence device may include a container that mimics a blackbody box configured to control the emission of light generated within the container. The sonoluminescence device generates a single bubble within a liquid of the container to initiate sonoluminescence. The sonoluminescence device can control the time between SBSL pulses while maintaining regular time intervals and the integrity of the bubble trapped within the container. These novel methods and all combinations of them are used to create a single photon source and a superradiant light source.

2 Claims, 16 Drawing Sheets

METHODS AND SYSTEMS FOR GENERATING A SINGLE PHOTON SOURCE AND A SUPERRADIANT LIGHT SOURCE FROM ACOUSTIC ENERGY

CROSS-REFERENCE TO RELATED APPLICATIONS

The present patent application claims the benefit of priority to U.S. Provisional Patent Application No. 63/426,499 filed Nov. 18, 2022, which is incorporated herein by reference in its entirety for all purposes

TECHNICAL FIELD

This disclosure relates generally to converting acoustic energy into forms of nonclassical light, and more particularly to generating a single photon source using acoustic energy, a container mimicking a blackbody box, and applications of various configurations of transducers to create nonclassical light as a single photon source.

BACKGROUND

A single photon source (SPS) emits light in single particle increments. SPS has numerous applications across all the sciences, including physics, telecommunication, chemistry, biology, medicine, etc. Existing systems capable of generating a SPS use expensive, external, pulsed lasers. These lasers induce stimulated emission in parametric down conversion, four-wave mixing, single ion excitation, color center, and quantum dots. The external, pulsed laser approaches are probabilistic, cannot be executed at room temperature, and undergo spontaneous emission due to Heisenberg's uncertainty principle. Furthermore, using pulsed lasers requires advanced technical knowledge to generate a SPS severely limiting the applications of such a SPS generated using external, pulsed lasers.

SUMMARY

Methods and systems are described herein for converting acoustic energy into a quantum photonics source, by creating single bubble sonoluminescence (SBSL). The SBSL can be manipulated to emit nonclassical light and as a single photon source. The emission of pair production photons is over picoseconds in duration. The emitted photons may present a light spectrum from the visible to ultraviolet light. Since the energy mechanism is undefined, energy forms can include Unruh radiation, dynamical Casimir effect, UV radiation, and other by-products of acoustic energy conversion into quantum, nonclassical light. Furthermore, this invention has novel methods and processes of turning SBSL into a single photon source.

The methods and systems may include a sonoluminescence device configured for concentrating, converting, pulsing, and/or pulsating acoustic energy into forms of nonclassical light with a second-order coherence ($g^{(2)}(0)$) of below one. In some examples, the techniques may form a single photon source (e.g., with a second-order coherence between 0 and 0.5). According to the Sandia National Laboratory, the single photon source may satisfy seven criteria: may be represented by a second-order correlation function, the photons generated by the single photon source may be indistinguishable from each other, photons generation may be triggered deterministically, photons can be generated at a high repetition rate, photons can be generated at room temperature, photons can be electrically injected, and the single photon source can be fabricated (e.g., as a sonoluminescence device) at chip-scale into microtechnology. The sonoluminescence device does not rely on external laser(s) for stimulated emission or the involvement of spontaneous emission.

The sonoluminescence device may include, but is not limited to, a container configured to hold a liquid, a stand configured to hold the container in various orientations and allow for SBSL, and an input interface configured to receive values for operational parameters of the sonoluminescence device. The sonoluminescence device generates nonclassical light sonoluminescence in the container that can be manipulated by an autonomous microcontroller. The container may hold liquid (e.g., such as any liquid) within which bubbles may be formed to create sonoluminescence. The container may include one or more emission openings and one or more detection openings. The container may be coated with an absorbent black paint to mimic a blackbody box such that emission and detection holes may be the only exposures to the container. The sonoluminescence device may degas the container using an automated vacuum pump. The container may also be removed for cleaning, replacing, and/or to remove any particle contamination from the container. The container can be detached by opening a vacuum-sealed face of the stand (e.g., using a metal buckle, or the like) and unclipping the electrical terminals of the transducer(s) and microphone.

Applying acoustic energy at the resonance frequency of the container can trap the bubble in the center of the container. The bubble will cavitate once the acoustic energy is increased from the trapping threshold to the sonoluminescence (SL) threshold. For single bubble sonoluminescence, the cavitation and expansion of the bubble may occur every few tens of microseconds with light pulse durations below 500 picoseconds. The size of the bubble (e.g., at below 100 microns) may oscillate within a dozen orders of magnitude. This cycle can occur around 1,000-100,000 times per second through continuous SL. The excitation of photons at which this occurs is approximately 100 times faster than the fastest visible transition of hydrogen, blackbody, or bremsstrahlung emission indicating that SBSL is of a quantum nature. Both Unruh radiation and dynamical Casimir effect processes turn virtual photons from a quantum vacuum field into real photon pairs (photon pair production). The quantum process of sonoluminescence photon emission is a clear 2-photon state ($|2_\xi\rangle$) from the quantum vacuum field.

The transition from acoustic energy into light energy is instantaneous (during cavitation when critical resonance and voltage for sonoluminescence is achieved), emitting photons without any delay and without violating Heisenberg Uncertainty principle (e.g., see FIG. 12). The photons emitted from SBSL are indistinguishable and entangled by:

$$|\Psi^\pm\rangle = \frac{1}{\sqrt{2}}(|0_1, 1_2\rangle \pm |1_1, 0_2\rangle) \quad [1.1]$$

Since the photons originate from a quantum mechanical mechanism, the photons are a pair production in a two-photon state by:

$$|2_\xi\rangle = \sqrt{2}\,(\hat{a}_\xi^\dagger)^2|0\rangle \quad [1.2]$$

In some examples, the sonoluminescence device can space each pulse of SBSL while maintaining regular clock-like intervals of time and space. The sonoluminescence device may automate the process of producing sonoluminescence in deterministic, even, time interval pulses, or continuously for a predetermined time duration. The sonoluminescence device can generate SBSL configured to last over an indefinite time interval (e.g., minutes, hours, days, etc.). The operational parameters of the sonoluminescence device may selected based on particular applications. Examples of the operational parameters that can be selected include, but are not limited to, time duration, number of pulses, time intervals between pulses, wavelengths (pair production of photons may be produced at wavelengths between microwave and ultraviolet, which may be beneficial to various quantum technologies), and/or the like. The sonoluminescence device may include an input interface (e.g., touchscreen display, input/output devices such switches or buttons, etc.) configured a selection of values of operational parameters. Alternatively, the sonoluminescence device may receive operational parameters over a network interface (e.g., Wi-Fi, Bluetooth, ethernet, etc.) or a wired connection with a computing device.

The sonoluminescence device may include one or more automated processes, which lowers from the SL threshold to the trapping threshold quicker than a bubble's cycle of contraction and expansion (after an initial light emission but before the succeeding light emission) and then increase back towards the SL threshold at longer, but even, time and space intervals, while keeping the bubble trapped and intact from popping.

The sonoluminescence device may then separate the photon pair, isolating the two-photon state ($|2_g\rangle$) into two single-photon states ($|1_a\rangle, |1_b\rangle$) leading to $g^{(2)}(0)$ values towards zero. At large time decay, $g^{(2)}(\tau)$ may decay towards the asymptotic value of unity and with a photon number state of one ($|1_{a,b}\rangle$). The 50:50 beam splitter may be a measurable beam splitter that transitions the pair of photons from an indistinguishable state into distinguishable single-photon states. The measurable beam splitter may then direct the individual photons through each output of the beam splitter. A single-photon state ($|1_a\rangle$) may be received at a fiber port parallel to the beam splitter at $n_{fiber}$ while the other photon state ($|1_b\rangle$) may be detected at the confirmation single-photon detector at $n_{confirmation}$. An optical fiber attachment can be coupled to the fiber port and configured to transmit single photons to devices.

In other examples of the invention, a symmetrical, spherical collapse of SBSL can be achieved using various configurations of transducer(s) around the container.

In other examples of the invention, the sonoluminescence device can join the previous two methods in all permutations of combinations.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 11:
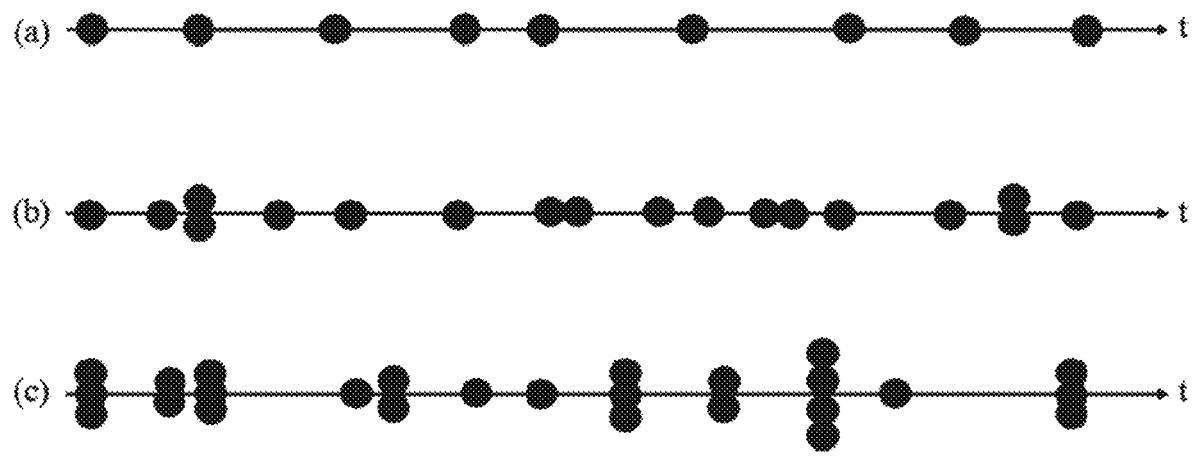
FIG. 11 illustrates an example graph of various types of light including (a) anti-bunched, (b) coherent, and (c) bunched light according to aspects of the present disclosure.

Nonclassical light may be classified by having a second-order correlation function (e.g., equation 1.3 below) that at zero is less than one (also referred to as anti-bunched light as shown in FIG. 11, where (a) anti-bunched, (b) coherent, and (c) bunched). A single-photon source may have a second-order correlation function at zero equal to any values between zero and 0.5 (with zero being an ideal single photon source). Most light sources are bunched light where this function is greater than one.

The second-order correlation function can be represented as:

$$g^{(2)}(\tau) = \frac{\langle n_3(t) n_4(t+\tau) \rangle}{\langle n_3(t) \rangle \langle n_4(t+\tau) \rangle}, \qquad [1.3]$$

where $n_i(t)$ is the number of photons registered on detector Di at time t and t+τ. The $n_3$ and $n_4$ represent the output ports of the beam splitter traveling towards the single-photon photodetectors. This equation displays that $g^{(2)}(\tau)$ is dependent on the simultaneous probability of counting photons at time t on the first detector and at time t+τ on the second detector.

The sonoluminescence device as described herein is configured to convert acoustic energy into nonclassical light. The sonoluminescence device may include a vacuum-sealed container configured to hold liquid (e.g., such as any liquid), a stand configured to hold the vacuum-sealed container, an input interface configured to receive operational parameters that control operations of the sonoluminescence device, a computing device (e.g., a desktop or laptop computer, mobile device such as a smartphone or tablet, a microcontroller, application-specific integrated circuit, field programmable gate array, processor, and/or the like) configured to execute one or more automated processes upon receiving values for the operational parameters, and/or the like.

Figure 1:
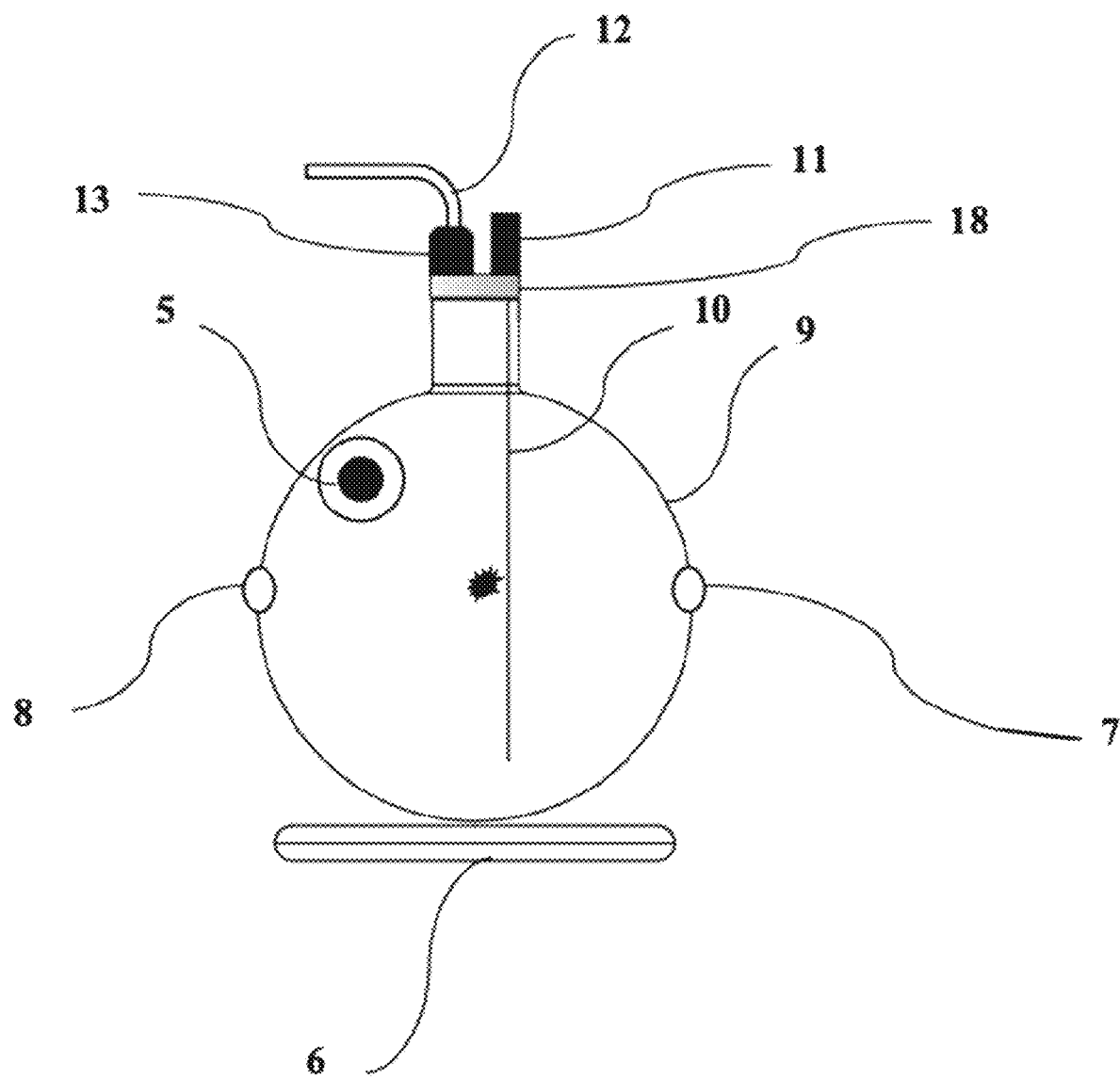
FIG. 1 illustrates an example container of a sonoluminescence device according to aspects of the present disclosure.
Figure 2:
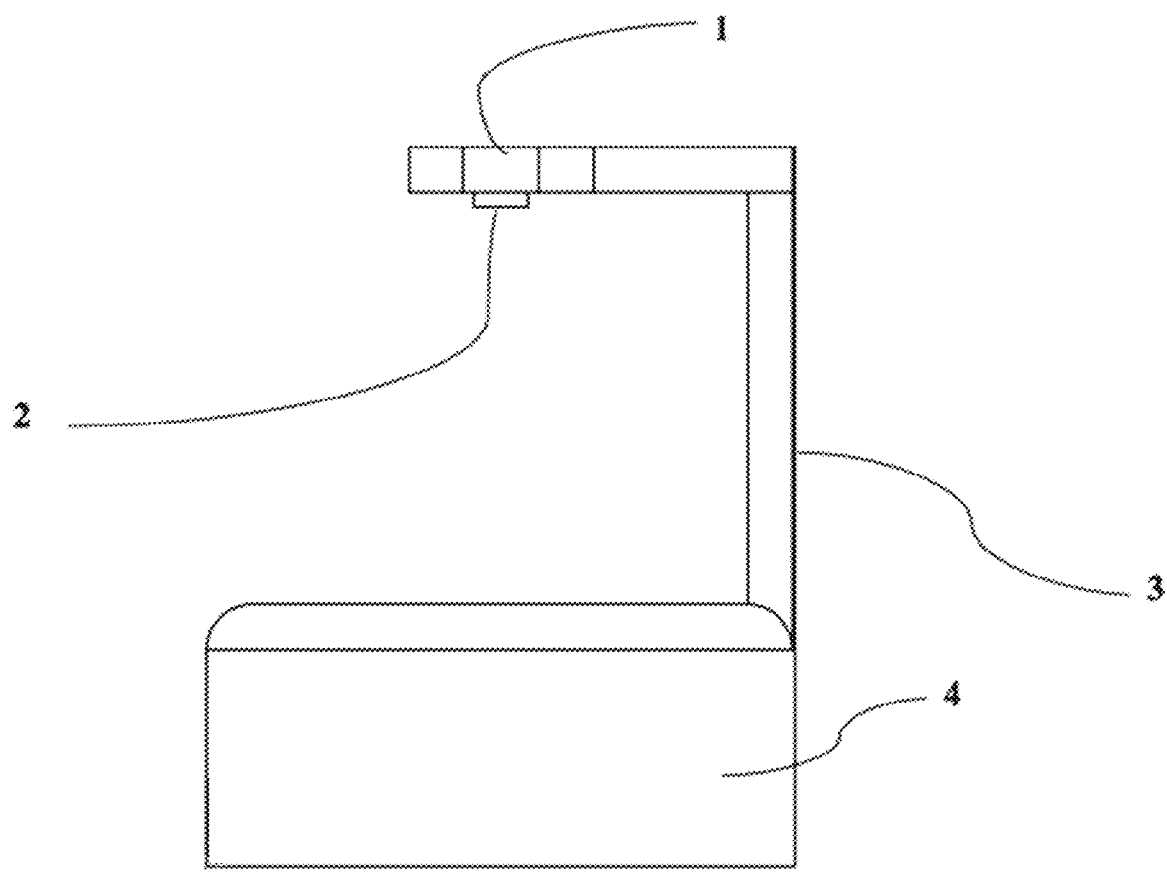
FIG. 2 illustrates an example stand of a sonoluminescence device according to aspects of the present disclosure.
Figure 3:
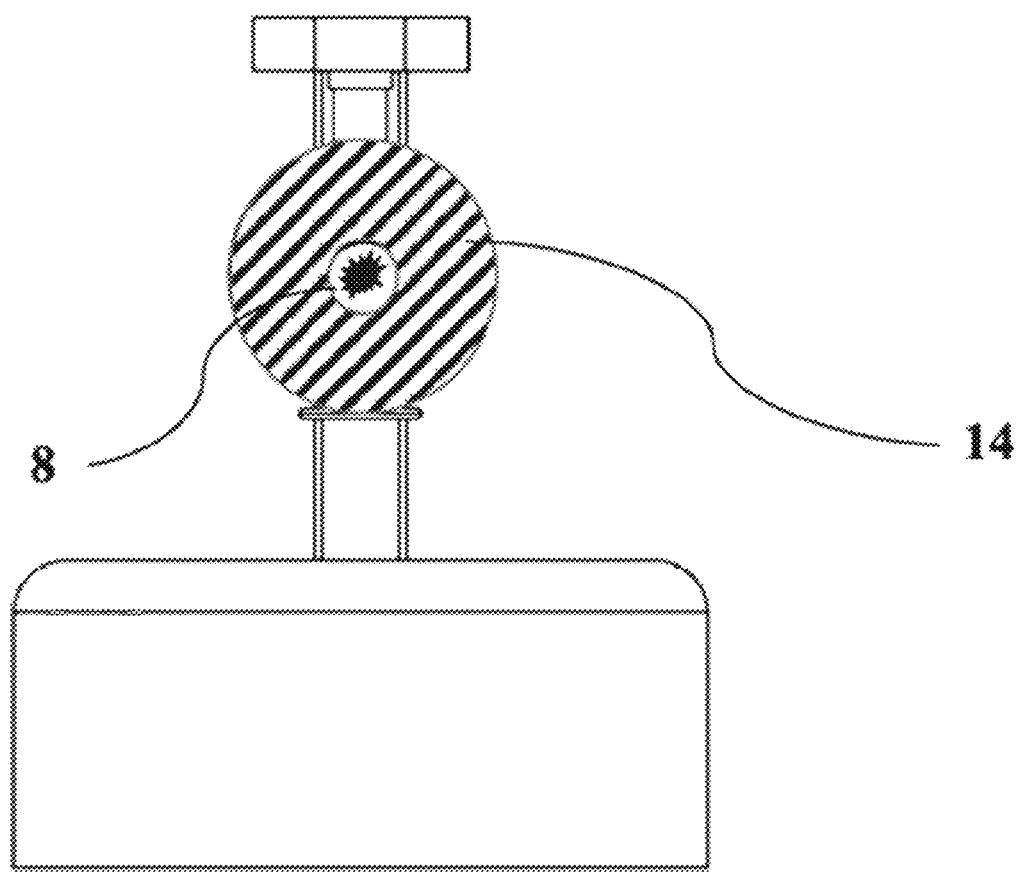
FIG. 3 illustrates another view of the example stand of the sonoluminescence device of FIG. 2 accompanied by an attached example container of FIG. 1 according to aspects of the present disclosure.
Figure 4:
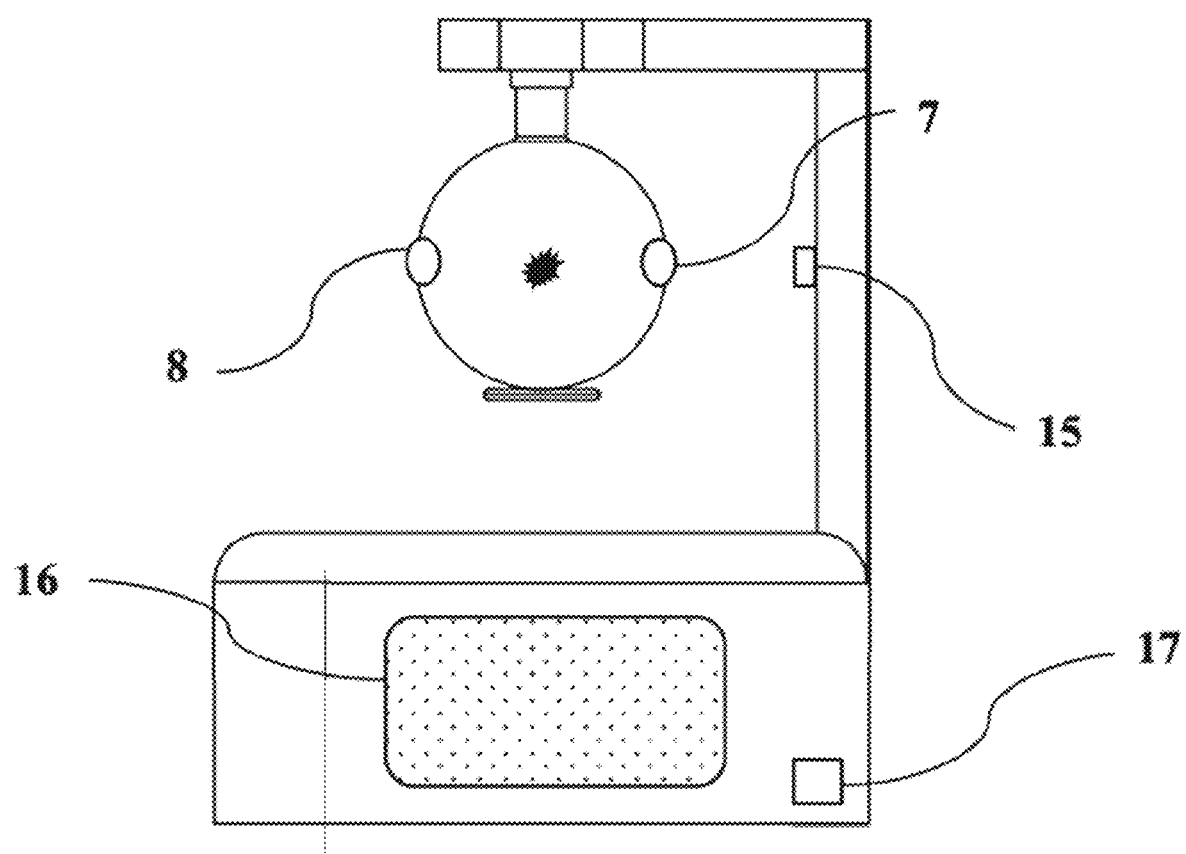
FIG. 4 illustrates an example sonoluminescence device including a container, stand, and input interface according to aspects of the present disclosure.

As shown in FIG. 2, the stand may include the components to make symmetrical, spherical cavitation while producing pulsed or continuous sonoluminescence deterministically. The base 4 may include electronic components and a vacuum pump installed therein. A leg may be attached to the base 4 to provide structural support for the face 1. The leg 3 may include a cavity configured to hold piping connected to the vacuum pump and wiring connection between the bubble injection motor 11 (as shown in FIG. 1) traveling toward the face 1 of the stand the computing device and/or power source. A photodetector 15 (as shown in FIG. 4) may be positioned along an external surface of the leg 3. The photodetector 15 may be configured to detect a presence of photon emissions from sonoluminescence through the detection port 7 of the container.

The face 1 and container resonance clipper 2 section of the face may be configured to engage a portion of the container and hold the container securely. The vacuum piping positioned within the leg 3 may be further affixed to or contained with the face 1 and connected to vacuum piping connection 12. Vacuum piping connection 12 is configured to be connected to check valve 13 creating a seal. Once sealed, the vacuum pump in the base 1 can create vacuum within the cavity. The face 1 may include a bubble injection motor 11 (as shown in FIG. 1) configured to connect the connection disc 18. A cross-section of the stand face (FIG. 5) illustrates the vacuum-seal connection of the connection disc to the face stand as one piece. Under the disc may include an underdamping cloth to reduce vibration of the stand due to the piezoelectric transducer(s) 6 connected to the container 9. The check valve may be configured to close to prevent the liquid in the container from leaving the container and damaging the vacuum pump. The bubble injection motor 11 may generate a spring force. In some instances, the bubble injection motor 11 may be configured to generate a spring force equal to one bubble production. In some instances, the bubble injection motor 11 may be configured to generate a spring force greater than or less than one bubble production. A thin needle 10 may extend from the motor into the container. An electrical signal from the computing device can initiate a single air injection of one micrometer sized bubble without a threshold quantity of air being added to the liquid within the container.

The container 9 may be a round-bottom flask with a various transducer(s) 6 positioned on a surface of the round-bottom flask and configured to produce a spherical cavitation of the SBSL. The container may be coated with a black light-absorbing paint 14 to act as a blackbody box and reduce escaping excess light from sonoluminescence. The container 9 may include an emission 8 port and a detection 7 port, the only means for photons to exit the container 9. An additional millimeter-sized piezoelectric transducer 5 may be affixed to the container to act as a microphone and measure the container's responses to electrical signals from the microcontroller. The millimeter-sized piezoelectric transducer 5 may be connected to the computing device, which may store measurements collected by the millimeter-sized piezoelectric transducer 5.

Figure 5:
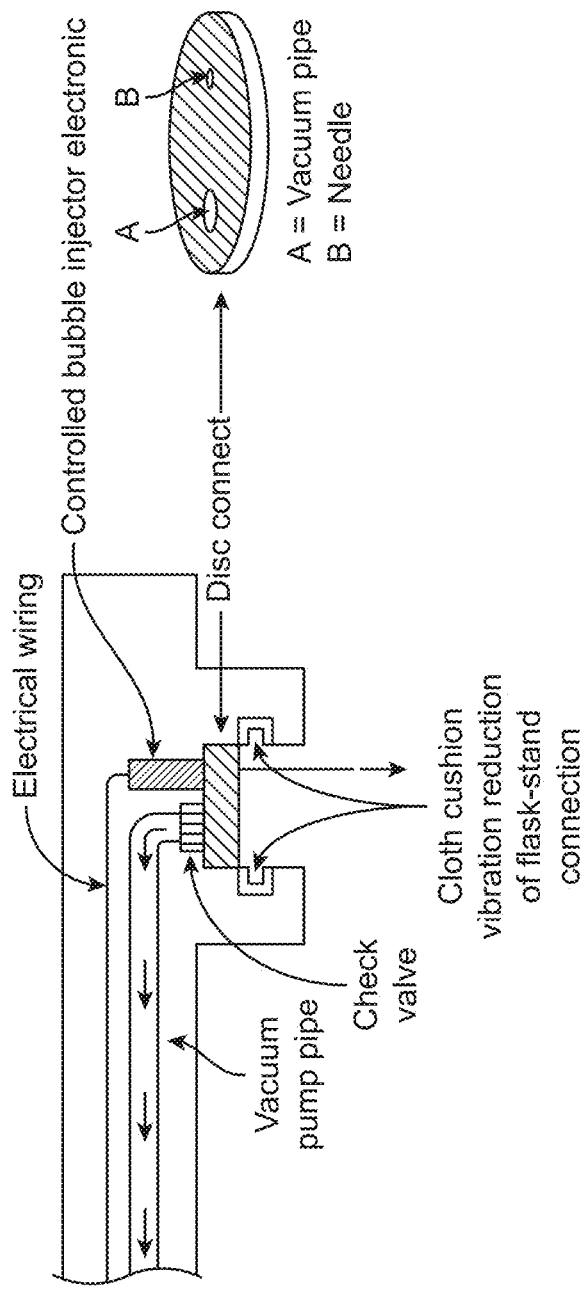
FIG. 5 illustrates a cross-sectional view of the face of the stand and its various hardwiring and mechanisms according to aspects of the present disclosure.
Figure 6:
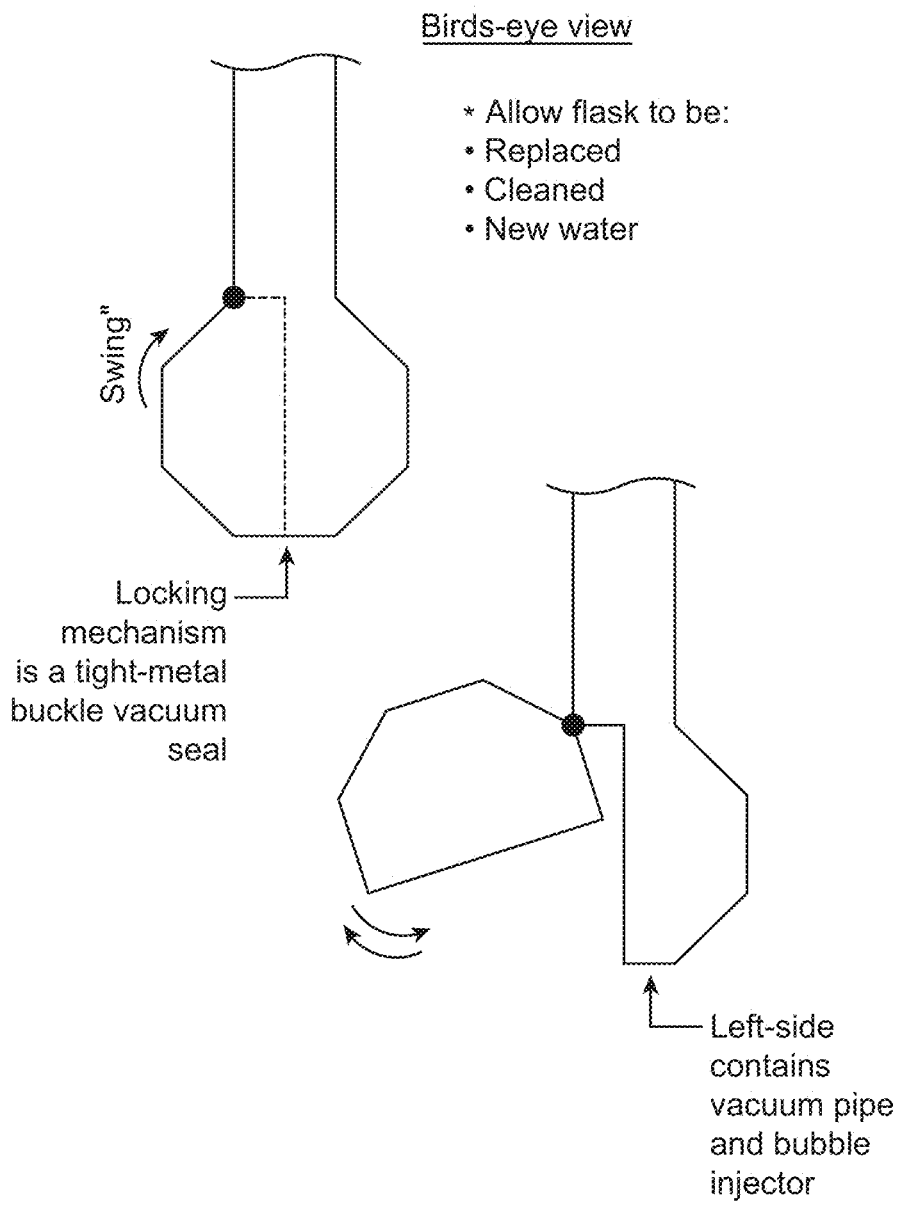
FIG. 6 illustrates another view of the example cross-sectional view of the face of the stand of the sonoluminescence device according to aspects of the present disclosure.

The container may be removably connected to the stand using a mechanical door mechanism. For example, the face 1 may include a mechanical door mechanism (as shown in FIG. 6). The mechanical door mechanism may include a first side (e.g., such as the right side when facing the stand face-on) that is a movable portion that separates from a second side (e.g., such as the left side when facing the stand face-on) that corresponds to a remaining portion of the mechanical door mechanism. The connection disc 18 with the vacuum pipe 12, check valve 13, and bubble injection motor 11 may affixed to the first side of the stand. The first side may separate from the second side by a sufficient degree so as to enable a lip of the container to be positioned into the underdamping cloth-cushion contained in the container resonance clipper 2 section of the face (e.g., as shown in FIG. 5 and FIG. 6). In some instances, the first side may separate from the second side by rotating 90 degrees relative to a starting position of the first side affixed to the second side. Once the first side separates from the second side, the lip of the container may be positioned into the underdamping cloth-cushion of the second side. The first side may then connect to the second side causing the container to be affixed to the stand. A locking mechanism may affix the first side to the second side. In some instance, the locking mechanism may be a metal buckle vacuum seal. In other instances, the locking mechanism may be any mechanism configured to create a vacuum seal.

Figure 7:
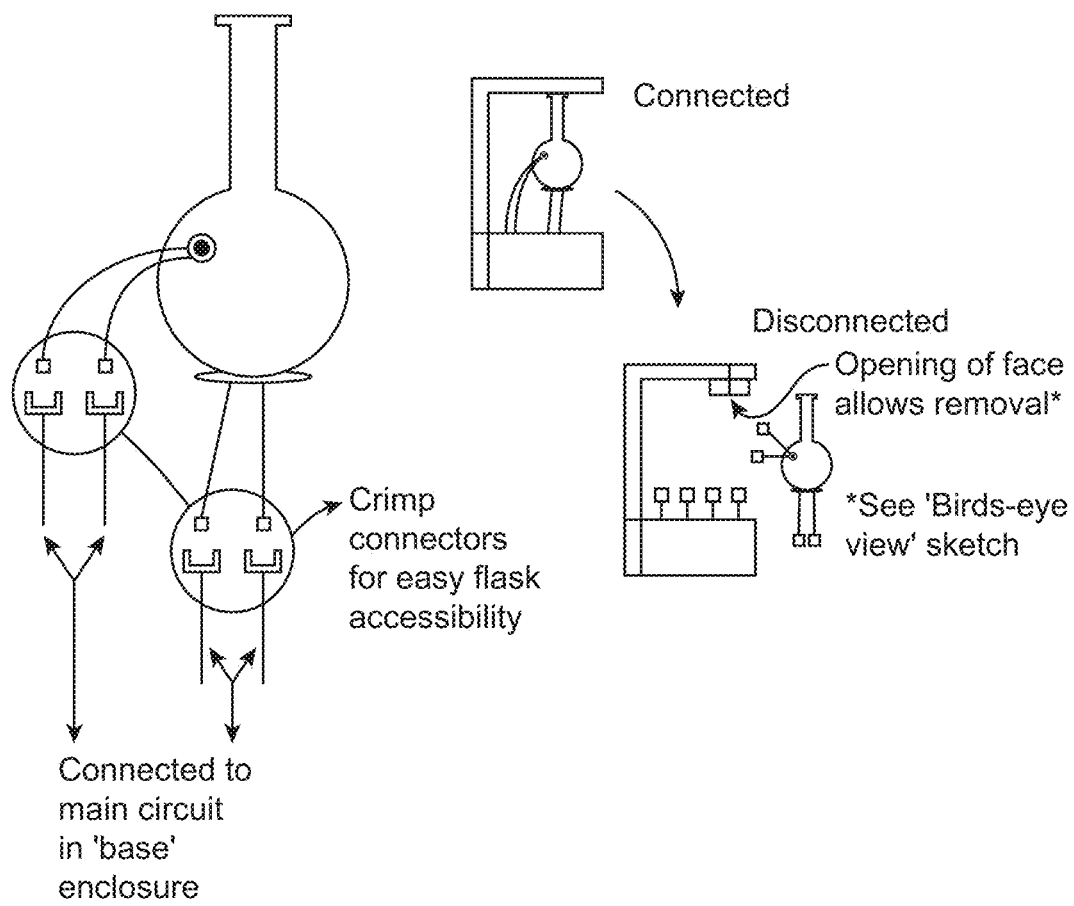
FIG. 7 illustrates an example process for connecting and disconnecting a container from a sonoluminescence device according to aspects of the present disclosure.
Figure 8:
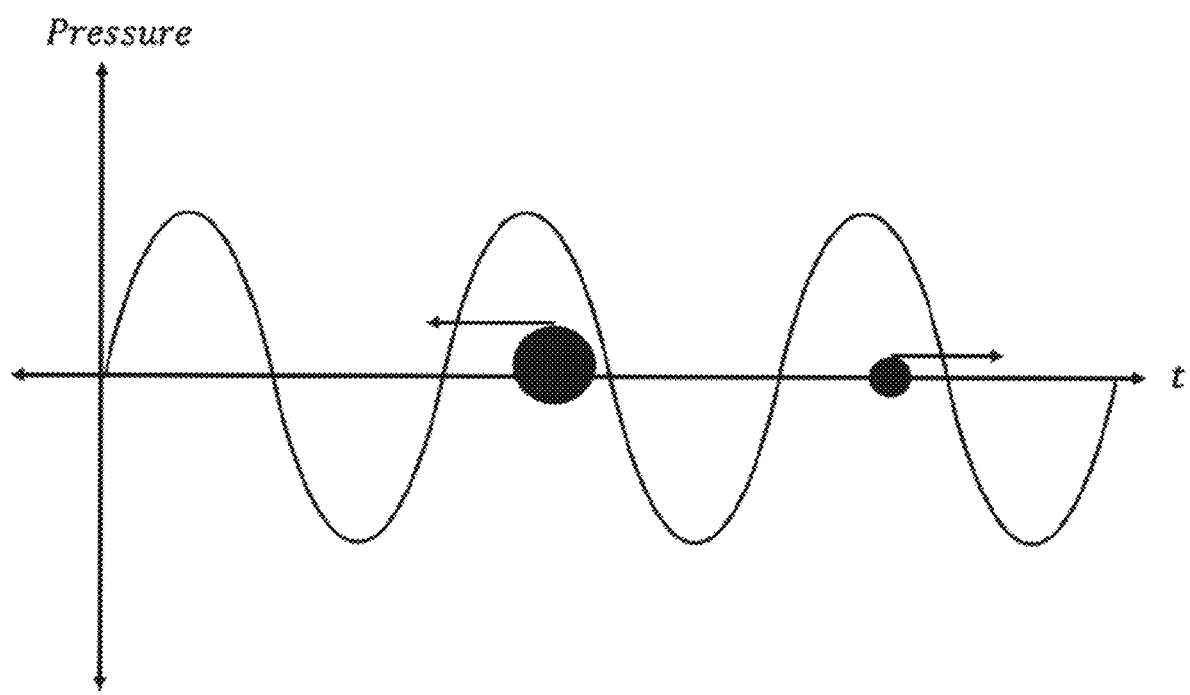
FIG. 8 illustrates the process of initiating sonoluminescence using generated electromagnetic acoustic sine wave according to aspects of the present disclosure.
Figure 9:
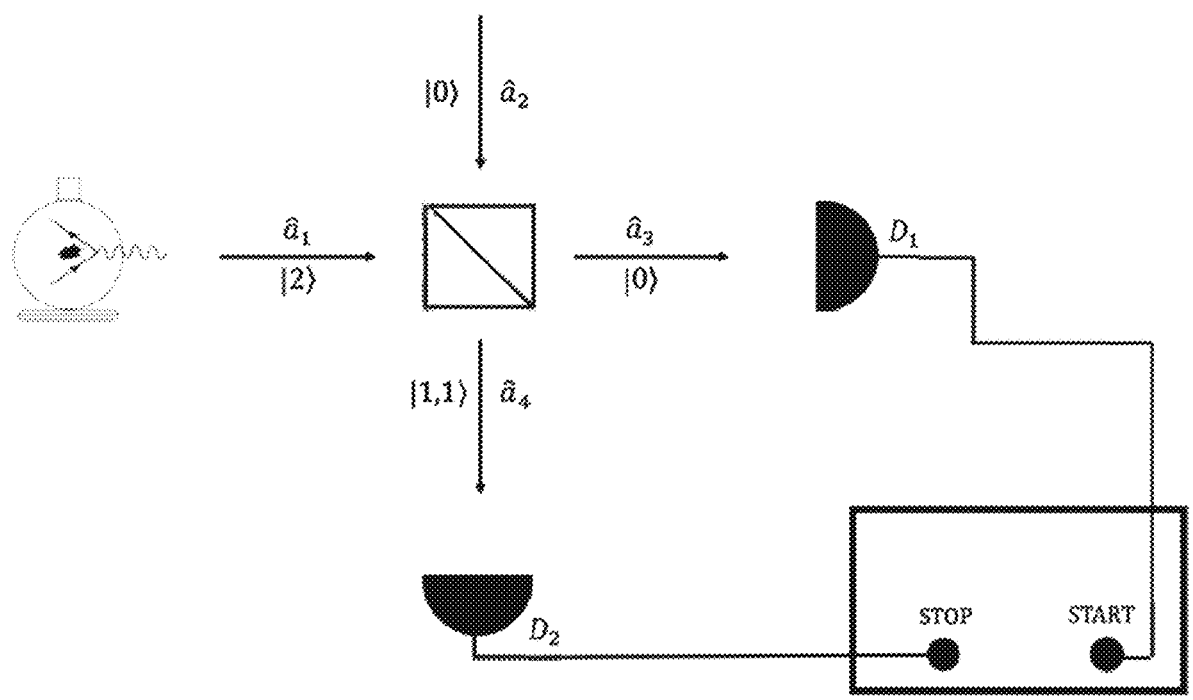
FIG. 9 illustrates the operations of emission, splitting of the generated photon pairs, and detection from the sonoluminescence device according to aspects of the present disclosure.

The piezoelectric transducer(s) 6 and microphone 5 can also be coupled and decoupled from the stand using an electrical crimp connector at the midpoint of the positive and negative terminals of the transducer(s). Electrical crimp connectors enable easy removal of the container to the electrical system without desoldering (as shown in FIG. 7). Once disconnected, the mechanical door mechanism may be operated to separate the container from the base. To couple the container to the stand, electrical crimps on the transducer(s) can be re-attached, and the re-opening of the mechanical door mechanism to place the lip of the container into the underdamping cloth-cushion contained in the container resonance clipper 2 section of the face. Once the container lip is secured in the container resonance clipper cushion area, the first side of the mechanical door mechanism can be connected to the second side (as previously described).

The computing device and vacuum pump may be positioned within a cavity formed by the container's base 4. An input interface 16 may be positioned along an outer surface of the base to enable selection of operational parameters. The input interface 16 may receive input directly from one or more user-operable controls (e.g., a touchscreen display, switches, buttons, knobs, etc.) or indirectly (e.g., from computing device connected to the input interface via a wired or wireless connection, from a remote computing device or server, etc.). In some examples, the computing device may include a microcontroller or processor configured to control the operations of one or more components such as, but not limited to, the microphone 5, main resonance circuit, power source, input interface 16, check valve 13, bubble injection motor 11, photodetector 15, transducer (s) 6, operational signal amplifier, photomultiplier 15, etc.

The sonoluminescence device may be powered using one or more batteries. The one or more batteries may be disposable or rechargeable using charging port 17. Alternatively, or additionally, charging port 17 may be configured connect the sonoluminescence device to a continuous power source. The sonoluminescence device may recharge the batteries then operate off an internal power (e.g., the batteries), external power (e.g., the continuous power source), or a combination of internal power and external power.

Figure 13A:
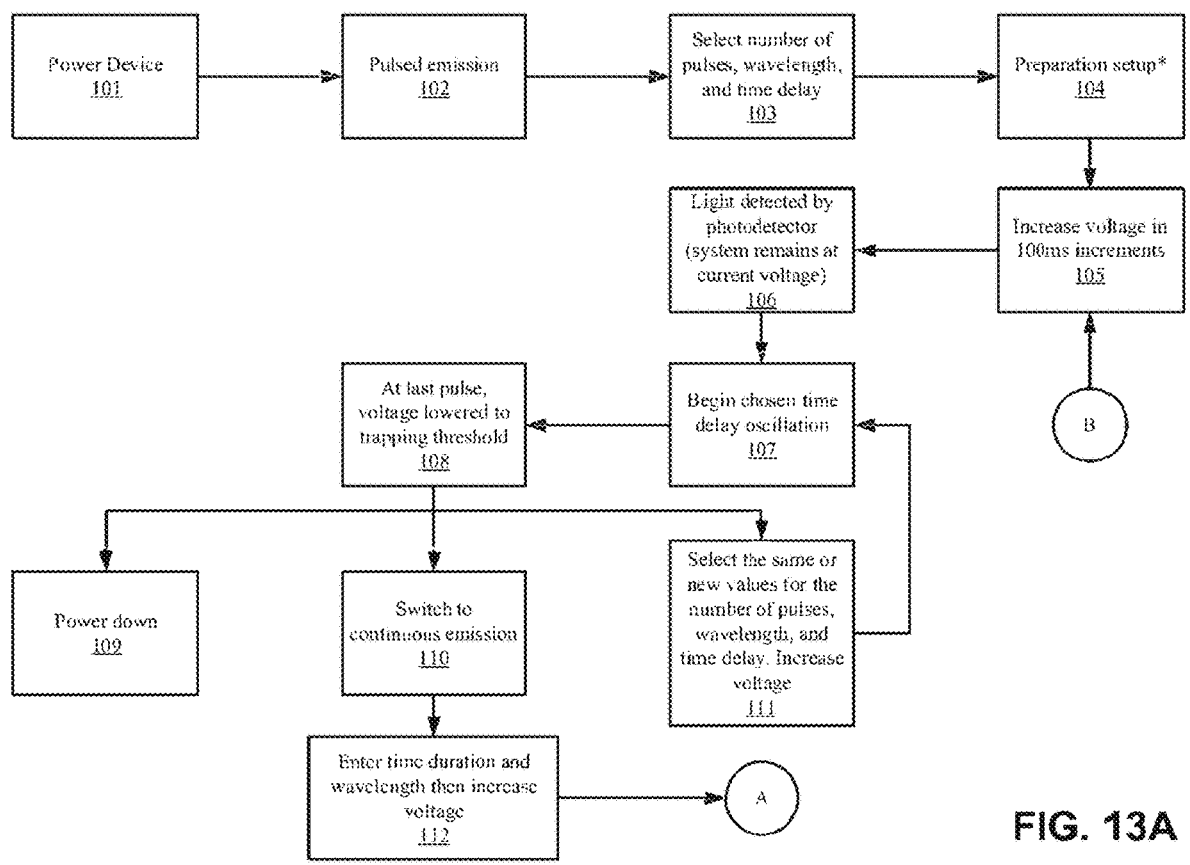
FIG. 13A-13B illustrate a flowchart of an example process for converting acoustic energy into non-classical light and single photons according to aspects of the present disclosure.
Figure 13B:
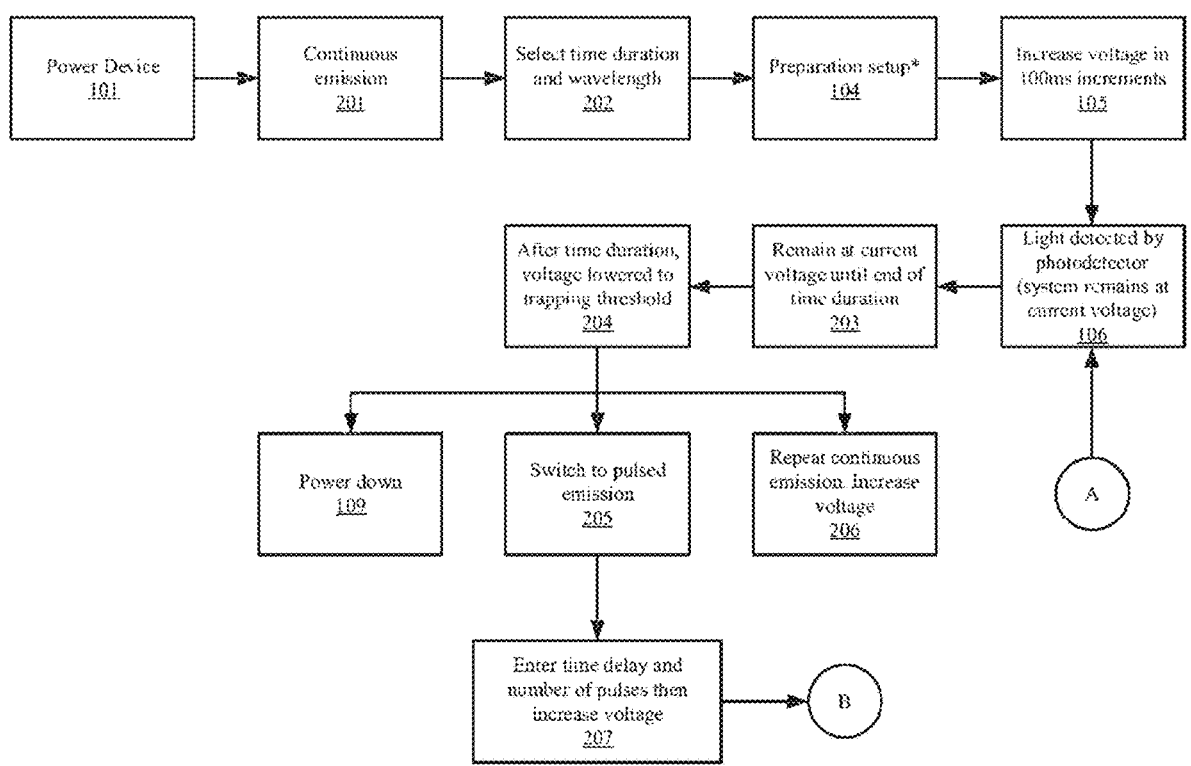
Figure 14:
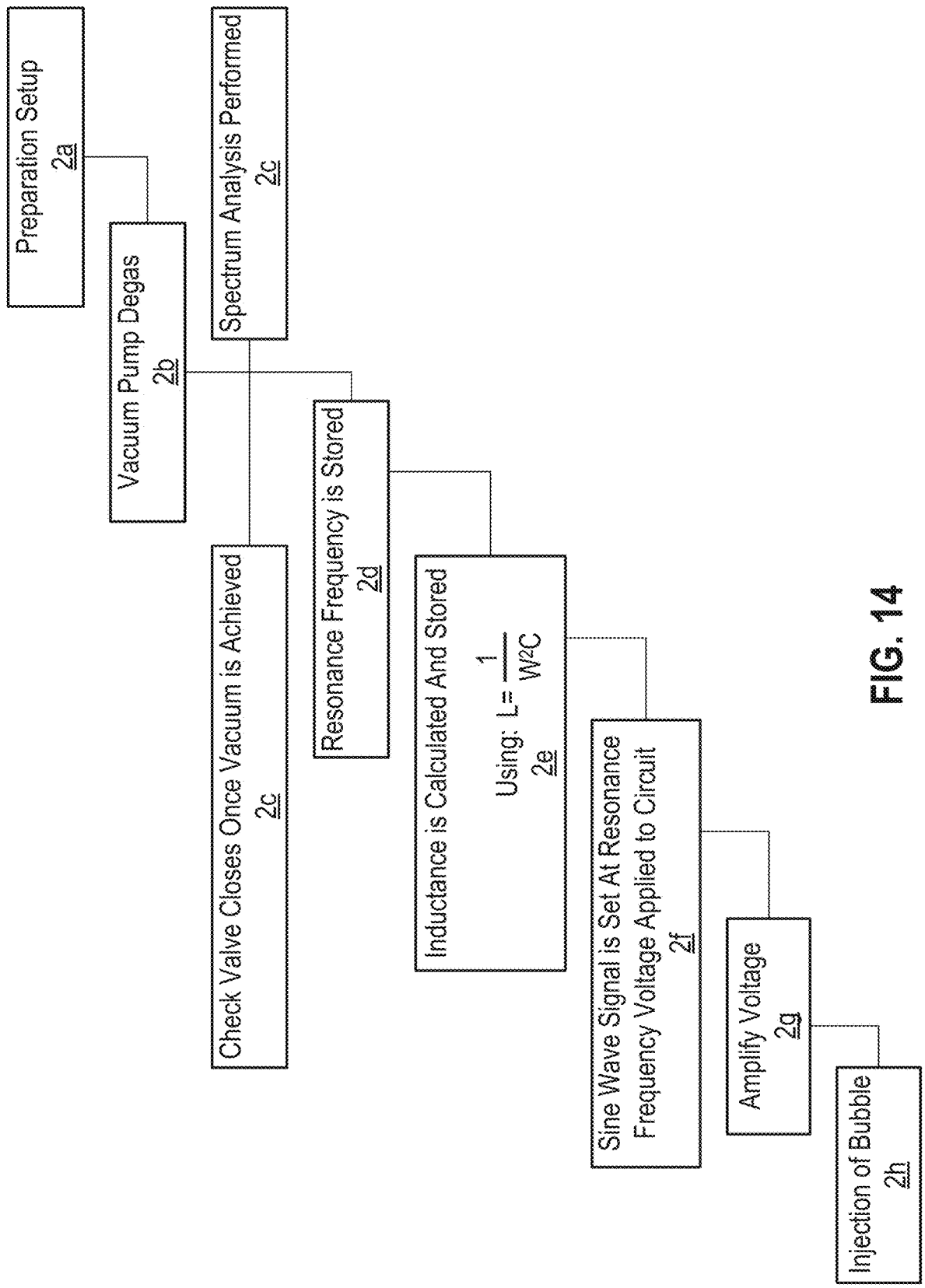
FIG. 14 illustrates an example process for initializing the sonoluminescence device according to aspects of the present disclosure.

Using the input interface, an operator can select values for operational parameters. For example, the operator can select between 'Pulsed' or 'Continuous' sonoluminescence (as shown in FIG. 13A, FIG. 13B, and FIG. 14). For 'Pulsed' sonoluminescence, the operator may also select a 'Number of pulses' and a 'Time delay' (between each pulse). For 'Continuous' sonoluminescence, the operator may select a 'Time duration'. In some instances, the computing device may include one or more default values for the operational parameters. If the operator fails to select a particular parameter, the computing device may select a default value for the unselected parameter. If the computing device includes more than one default value for a parameter, the computing device may select a particular default value based on the values that the operator did select for other operational parameters.

After selecting the values for the operational parameters, the computing device may execute 'Preparation Setup' (as shown in FIG. 14). The 'Preparation Setup' may execute before pulsed sonoluminescence and/or before continuous sonoluminescence. 'Preparation Setup' can include determining whether the liquid is degassed, and if not, then executing a degassing process.

The computing device may then identify a resonance frequency of the container using spectrum analysis of data collected from the microphone 5. The identified resonance frequency may be stored within memory. The computing device may calibrate the main resonance circuit (RLC resonance circuit) to match the identified resonance frequency with the transducer(s) capacitance and while solving for an inductance that can be applied to the variable inductor bus to achieve resonance. A sine wave matching the resonance frequency of the container may be generated by a signal generator and sent through an audio power amplifier to amplify the sine wave to the trapping voltage. The amplified sine wave may be sent into the main resonance circuit. The process may then continue through the 'Pulsed' (as shown in FIG. 13A) or 'Continuous' procedures (as shown in FIG. 13B).

Figure 12:
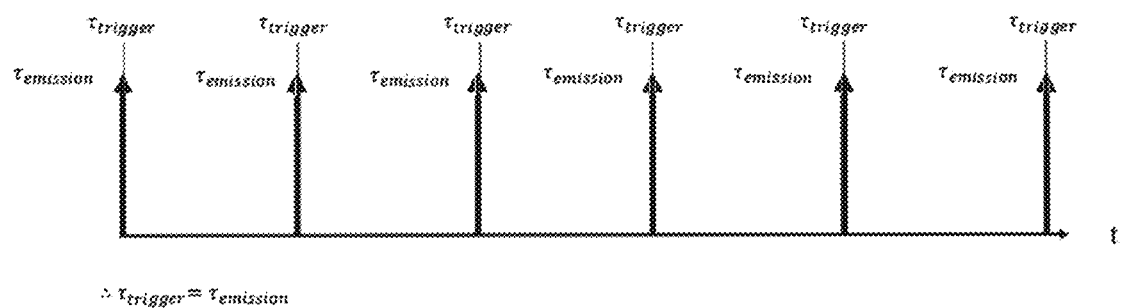
FIG. 12 illustrates the timing of the transition from acoustic energy into light energy according to aspects of the present disclosure.

During 'Pulsed' sonoluminescence, the transition from acoustic energy into light energy may be instantaneous (during cavitation when critical resonance and voltage for sonoluminescence is achieved), emitting photons without any delay and without violating Heisenberg Uncertainty principle (as shown in FIG. 12). 'Pulsed' sonoluminescence may be achieved (as shown in FIG. 13A, FIG. 14) first by going through a 'Preparation Setup' (box 104 of FIG. 13A and beginning at box 2a of FIG. 14). The liquid may be degassed (box 2b). Then the sine wave at the resonance frequency may be identified using spectrum analysis (box 2c) and then stored within memory (box 2d), and an inductance value for the inductor bus can be identified (box 2e). The sine wave may be amplified to the trapping voltage threshold and sent through the RLC circuit using the power audio amplifier (box 2f). Afterwards, the voltage is amplified (box 2g) and then a bubble is injected (box 2h), which will be trapped in the center of the flask at the trapping voltage threshold. Boxes 2a-2h may include processes that can be executed by the computing device. From the trapping voltage threshold, the computer will begin 'Pulsed' or 'Continuous' sonoluminescence procedures. Following 'Preparation Setup', the computing device will increase the amplified voltage of the sine wave from the trapping voltage threshold to a sonoluminescence voltage threshold in 100 ms increments (box 105). Once achieved and photons are detected by the photodetector 6, the computing device may begin oscillating the voltage amplitude driven by the amplifier by millivolts with a time separation between each decrease then increase by the time delay chosen by the user (box 107). After the last pulse (or last increase), the computing device may decrease the voltage back to the trapping voltage threshold until further instruction is given at the interface (box 108).

$$\tau_{trigger} = \tau_{emission} \qquad [1.4]$$

Figure 10:
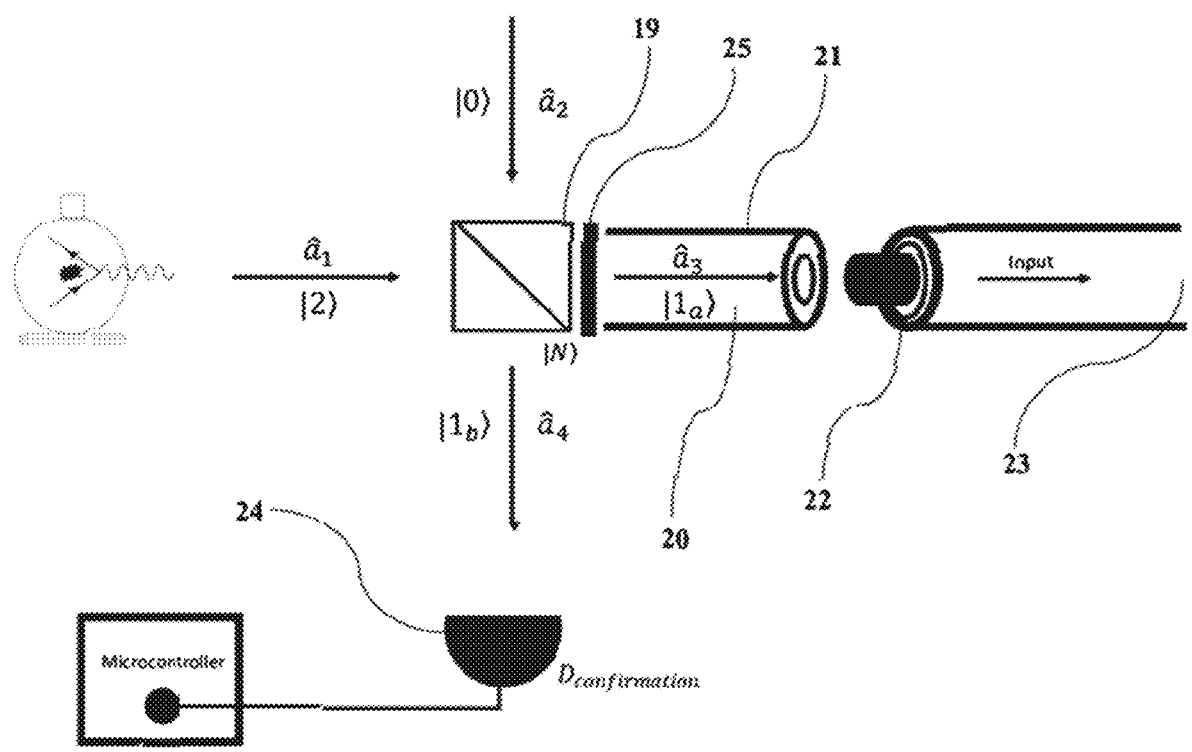
FIG. 10 illustrates another view of the sonoluminescence device in FIG. 9, including but not limited to detection, a measurable beam splitter, and the automation via the integration of a microcontroller of a sonoluminescence device according to aspects of the present disclosure.

Using a measurable beam splitter 19, spectral filter 25, a single-photon detector ($D_{confirmation}$) 24, and adaptive optical fiber compatible attachment 21 to the parallel section of the beam splitter (as shown in FIG. 10), the sonoluminescence device produces a single-photon ($11_a$) ) deterministically with a $g^{(2)}(0) \geq 0$ at room temperature. When the indistinguishable, entangled photons are measured by the measurable beam splitter, each photon may travel a separate path after exiting the beam splitter. A one-photon state can be detected as confirmation at $D_{confirmation}$ and another one-photon state can be electrically injected 20 into the optical fiber cable attachment 21. The sonoluminescence device may transmit on-demand single photons 25 using the optical fiber attachment 21.

The sonoluminescence device may transmit on-demand single-photons 23 to whatever device that is an optical fiber compatible male 22.

Figure 15:
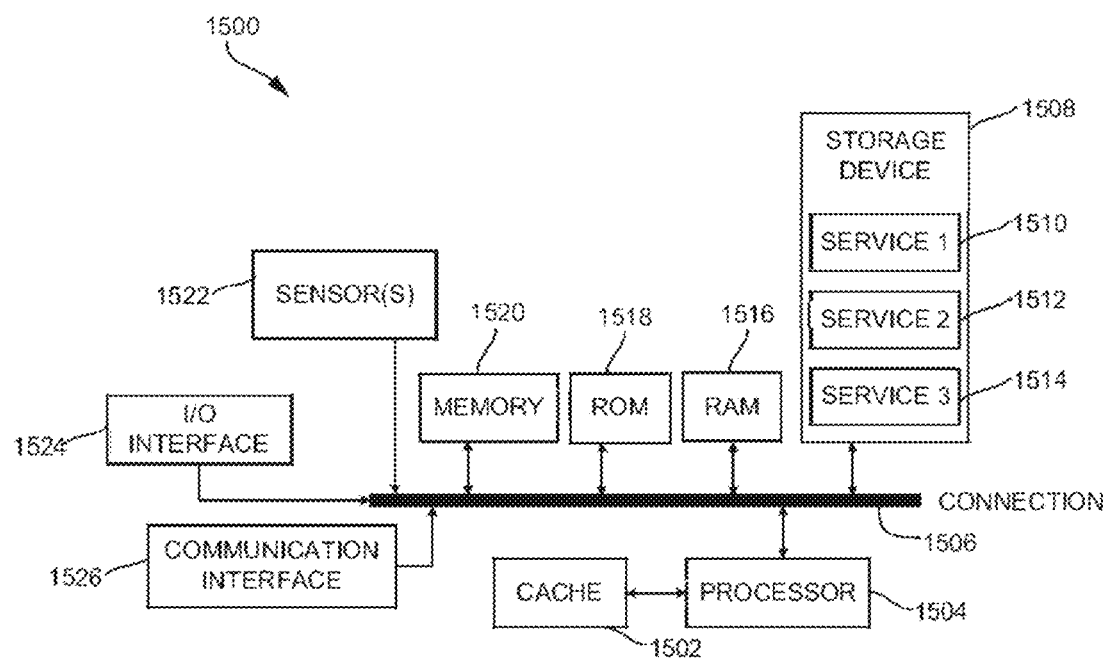
FIG. 15 illustrates an example computing system architecture including various components in electrical communication with each other and configured to implement aspects of the present disclosure.

FIG. 15 illustrates an example computing system architecture including various components in electrical communication with each other and configured to implement aspects of the present disclosure. FIG. 15 illustrates computing system architecture 1500 including various components in electrical communication with each other using a connection 1506, such as a bus, in accordance with some implementations. Example computing system architecture 1500 includes a processing unit (CPU or processor) 1504 and a system connection 1506 that couples various system components including the system memory 1520, such as ROM 1518 and RAM 1516, to the processor 1504. The system architecture 1500 can include a cache 1502 of high-speed memory connected directly with, in close proximity to, or integrated as part of the processor 1504. The system architecture 1500 can copy data from the memory 1520 and/or the storage device 1508 to the cache 1502 for quick access by the processor 1504. In this way, the cache can provide a performance boost that avoids processor 1504 delays while waiting for data. These and other modules can control or be configured to control the processor 1504 to perform various actions.

Other system memory 1520 may be available for use as well. The memory 1520 can include multiple different types of memory with different performance characteristics. The processor 1504 can include any general-purpose processor and a hardware or software service, such as service 1 1510, service 2 1512, and service 3 1514 stored in storage device

1508, configured to control the processor 1504 as well as a special-purpose processor where software instructions are incorporated into the actual processor design. The processor 1504 may be a completely self-contained computing system, containing multiple cores or processors, a bus, memory controller, cache, etc. A multi-core processor may be symmetric or asymmetric.

Computing system architecture 1500 may receive input from one or more sensors 1522 electrically coupled to computing system architecture 1500. Alternatively, or additionally, computing system architecture 1500 may receive input from one or more additional sensors connected wirelessly to computing system architecture 1500 through communication interface 1526. Sensors 1522 can include any type of sensor including, but not limited to, accelerometer, gyroscope, pressure sensor (e.g., for measuring air pressure, fluid pressure, etc.), distance sensor (e.g., time-of-flight, infrared triangulation, ultrasonic, etc.), temperature sensor, hygrometer, radiation detector, chemical detectors, and/or the like. Communication interface 1526 can generally govern and manage user input (e.g., via I/O interface 1524 or communication interface 1526), input from sensors 1522, and system output (e.g., via I/O interface 1524 or communication interface 1526). There is no restriction on operating on any particular hardware arrangement and therefore the basic features here may easily be substituted for improved hardware or firmware arrangements as they are developed.

Storage device 1508 is a non-volatile memory and can be a hard disk, or other types of computer readable media which can store data that are accessible by a computer, such as flash memory cards, solid state memory devices, cartridges, RAMs 1516, ROM 1518, and hybrids thereof.

The storage device 1508 can include services 1510, 1512, 1514 for controlling the processor 1504, communication interface 1526, etc. Other hardware or software modules are contemplated. The storage device 1508 can be connected to the system connection 1506. In one aspect, a hardware module that performs a particular function can include the software component stored in a computer-readable medium in connection with the necessary hardware components, such as the processor 1504, connection 1506, Input Output Interface 1524, and so forth, to carry out the function.

This disclosure contemplates the computer system taking any suitable physical form. As an example, and not by way of limitation, the computer system may be an embedded computer system, a system-on-chip (SOC), a single-board computer system (SBC) (such as, for example, a computer-on-module (COM) or system-on-module (SOM)), microcontroller, application-specific integrated circuit (ASIC), field-programable-gate array, etc. Where appropriate, the computer system may include one or more computer systems; be unitary or distributed; span multiple locations; and/or span multiple machines. Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional processor. One of skill in the relevant art will recognize that the terms "machine-readable (storage) medium" or "computer-readable (storage) medium" include any type of device that is accessible by the processor. The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory or in volatile memory (loaded from a local or remote source). It should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to communication interface 1526. Communication interface 1526 may include one or more components configured to connect to one or more remote devices. For example, communication interface 1526 may include one or more physical connections such as ethernet, universal serial bus, microwire, RS232, RS485, etc. or one or more wireless connections. Wireless connections can be facilitated using transmitters, receivers, or transceivers. Communication interface 1526 may be configured to communicate wirelessly using any wireless protocol such as, but not limited to Wi-Fi, Bluetooth, Z-wave, Zigbee, or the like. The interface can output to one or more input and/or output (I/O) devices such as display devices, remote computing devices, other remote sensor devices, etc. The display device can include, by way of example but not limitation, a cathode ray tube (CRT), liquid crystal display (LCD), light emitting diodes, or some other applicable known or convenient display device.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included. A process may correspond to a method, a function, a procedure, a subroutine, a subprogram, etc.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method comprising:
receiving, at an interface of a sonoluminescence device, input corresponding to values for one or more operational parameters of the sonoluminescence device, wherein the operational parameters include a number of pulses, a wavelength, and/or a time delay;
generating, by a probe at least partially positioned within a volume of liquid, at least one bubble;
emitting, by a transducer, acoustic energy towards a volume of liquid, wherein the acoustic energy is emitted at a frequency selected based on the wavelength;
incrementally adjusting a voltage applied to the transducer until light is detected, wherein the light is generated by a sonoluminescence reaction of the at least one bubble;
executing a set of pulses approximately equal to the number of pulses by oscillating the voltage applied to the transducer, wherein each pulse outputs a pair of photons by the sonoluminescence reaction, and wherein each pulse of the set of pulses is separated according to the time delay; and
lowering the voltage applied to the transducer to a trapping threshold once the set of pulses are executed to stabilize the at least one bubble.

2. A method comprising:
receiving, at an interface of a sonoluminescence device, input corresponding to values for one or more operational parameters of the sonoluminescence device, wherein the operational parameters include a time duration and/or a wavelength;
generating, by a probe at least partially positioned within a volume of liquid, at least one bubble;
emitting, by a transducer, acoustic energy towards the volume of liquid, wherein the acoustic energy is emitted at a frequency selected based on the wavelength;
incrementally adjusting a voltage applied to the transducer until one or more photons are detected, wherein the one or more photons are generated by sonoluminescence reaction of the at least one bubble;
initiating a timer upon detecting the one or more photons;
determining that a value of the timer is greater than the time duration; and
lowering the voltage applied to the transducer upon determining that a value of the timer is greater than the time duration to stabilize the at least one bubble.

* * * * *